(12) United States Patent
Kaneko

(10) Patent No.: US 7,716,318 B2
(45) Date of Patent: May 11, 2010

(54) IMAGE FORMING APPARATUS MONITORING SYSTEM AND METHOD, IMAGE FORMING APPARATUS, CONTROL METHOD THEREFOR, AND PROGRAM FOR IMPLEMENTING THE METHOD

(75) Inventor: Tsuyoshi Kaneko, Sagamihara (JP)

(73) Assignee: Canon Kabushiki Kaisha (JP)

( * ) Notice: Subject to any disclaimer, the term of this patent is extended or adjusted under 35 U.S.C. 154(b) by 1359 days.

(21) Appl. No.: 11/158,233

(22) Filed: Jun. 21, 2005

(65) Prior Publication Data

US 2005/0281566 A1    Dec. 22, 2005

(30) Foreign Application Priority Data

Jun. 21, 2004  (JP)  ............... 2004-182450
May 27, 2005  (JP)  ............... 2005-155744

(51) Int. Cl.
*G06F 15/173* (2006.01)
(52) U.S. Cl. ..................... 709/223; 709/224
(58) Field of Classification Search .......... 709/224
See application file for complete search history.

(56) References Cited

U.S. PATENT DOCUMENTS

| | | | |
|---|---|---|---|
| 6,430,711 | B1 | 8/2002 | Sekizawa |
| 2001/0029541 | A1 | 10/2001 | Tomita |
| 2004/0205262 | A1* | 10/2004 | Ikeno ............... 710/15 |
| 2004/0222895 | A1* | 11/2004 | Rozier et al. ......... 340/611 |

FOREIGN PATENT DOCUMENTS

| | | | |
|---|---|---|---|
| JP | 6-315059 | A | 11/1994 |
| JP | 11-353145 | A | 12/1999 |
| JP | 2001-16393 | A | 1/2001 |
| JP | 2001-344160 | A | 12/2001 |
| JP | 2003-186765 | A | 7/2003 |
| JP | 2004-5543 | A | 1/2004 |

* cited by examiner

*Primary Examiner*—Patrice Winder
*Assistant Examiner*—Xiang Yu
(74) *Attorney, Agent, or Firm*—Rossi, Kimms & McDowell LLP

(57) ABSTRACT

An image forming apparatus monitoring system which is configured so as to reduce an installing operation load for installation of image forming apparatuses including settings relating to monitoring apparatus. In the present system, when a multi-function machine determines that it is not registered in the image forming apparatus monitoring system, the multi-function machine searches for a monitoring apparatus 105 which matches the multi-function machine, and selects the monitoring apparatus 105 which is to monitor the multi-function machine, based on monitoring apparatus information acquired from the searched monitoring apparatus 105. When receiving a notification of the start of monitoring from the selected monitoring apparatus 105, the multi-function machine stores the notification in a storage area as registration completion information. On the other hand, the monitoring apparatus 105 transmits monitor request information received from the multi-function machine to the monitoring host 101, and starts monitoring the multi-function machine when determining from the result of the monitor request that registration of the multi-function machine in the monitoring host 101 is completed.

15 Claims, 13 Drawing Sheets

FIG. 9B

| NUMBER OF MONITORED MACHINES |
|---|
| 5 |

FIG. 9A

| MULTI-FUNCTION MACHINE ID | IP ADDRESS |
|---|---|
| TKID123456 | 197.71.21.05 |
| STID123456 | 198.61.11.90 |
| TKST123456 | 200.20.21.700 |
| ... | ... |

FIG. 12

| MULTI-FUNCTION MACHINE ID | TKID123456 |
|---|---|
| MONITORING APPARATUS ID | 123.45.67.890 |

DIVISION X, COMPANY A

IMAGE FORMING APPARATUS MONITORING SYSTEM AND METHOD, IMAGE FORMING APPARATUS, CONTROL METHOD THEREFOR, AND PROGRAM FOR IMPLEMENTING THE METHOD

BACKGROUND OF THE INVENTION

1. Field of the Invention

The present invention relates to an image forming apparatus monitoring system and method, an image forming apparatus and a control method therefor, and a program for implementing the method, and more particularly relates to a setup technique relating to the image forming apparatus monitoring system.

2. Description of the Related Art

Conventionally, in an image forming apparatus monitoring system, to register image forming apparatuses to be monitored, in the monitoring system, a service man who performs installation of the image forming apparatus and management of a monitoring apparatus registers in advance information of network environments of clients, and image forming apparatuses in the monitoring apparatus and a monitoring host, and newly registers an image forming apparatus in an image forming apparatus monitoring service at the time of installation of the image forming apparatus (for example, see Japanese Laid-Open Patent Publication (Kokai) No. H06-315059).

Further, an operator of the monitoring host determines which monitoring apparatus is to monitor the installed image forming apparatus, and after the operator informs the service man of this, a setting operation is carried out to make necessary settings of the apparatuses.

Furthermore, there has been disclosed a monitoring system including a communication control apparatus which mediates between a plurality of image forming apparatuses and a service center (also called a monitoring host) and monitors the respective numbers of sheets printed, troubles and the like of the image forming apparatuses, the monitoring system being configured such that, to reduce a load when an image forming apparatus is newly added to the monitoring system, the communication control apparatus is notified of a monitoring service start request via a display section of the image forming apparatus, and a communication test or the like is conducted between the communication control apparatus and the service center in response to the notification (for example, see Japanese Laid-Open Patent Publication (Kokai) No. 2001-016393).

Meanwhile, in recent years, image forming apparatuses to be monitored in office environments, which are essentially designed to perform network communications conforming to TCP/IP have become widely used, and accordingly it is desired that the image forming apparatus monitoring system itself should comply with the above network communications. For example, Japanese Laid-Open Patent Publication (Kokai) No. 2004-005543 discloses a network-compatible image forming apparatus monitoring system. It is desired that also this network-compatible image forming apparatus monitoring system should undergo a reduced load upon processing when a new image forming apparatus to be monitored is added to the monitoring system.

However, none of the above described conventional systems is not designed to perform network connections, and it is therefore the problem how easily addition of an image forming apparatus to the monitoring system should be performed in this network environment.

In particular, under the network environment, not only the monitoring apparatus but also various devices and apparatuses such as image forming apparatuses, various kinds of servers, and client computers are connected to the network. The image forming apparatus monitoring system disclosed in Japanese Laid-Open Patent Publication (Kokai) No. 2001-016393 is not compatible with the network, and hence, a desired image forming apparatus cannot be easily selected for monitoring by the monitoring apparatus from a plurality of devices and apparatuses on the network.

Therefore, the conventional monitoring system should be desirably configured so as to reduce an installing operation load for installation of image forming apparatuses including settings relating to the monitoring apparatus.

SUMMARY OF THE INVENTION

The present invention has been devised in order to overcome the above-described disadvantages with the prior art, and it is an object of the present invention to provide an image forming apparatus monitoring system and method, an image forming apparatus, and a control method therefor, which are configured so as to reduce an installing operation load for installation of image forming apparatuses including settings relating to monitoring apparatus, and a program for implementing the method.

To attain the above object, in a first aspect of the present invention, there is provided an image forming apparatus monitoring system comprising a monitoring host, a plurality of monitoring apparatuses, at least one image forming apparatus that sends predetermined information and searches at least one monitoring apparatus from the plurality of monitoring apparatuses, and a communication line, the monitoring apparatus searched out collects the predetermined information and transmits same to the monitoring host, and the monitoring host, the monitoring apparatuses and the image forming apparatus are connected to one another via the communication line, for performing communications therebetween, the image forming apparatus comprises, a status determining device that determines whether or not the image forming apparatus is registered in the image forming apparatus monitoring system, an information display device that displays a registration status of the image forming apparatus, a monitoring apparatus searching device operable when the image forming apparatus is determined not to be registered by the status determining device, to search the at least one monitoring apparatus that is to monitor the image forming apparatus, a monitoring apparatus information acquiring device that acquires monitoring apparatus information from the at least one monitoring apparatus searched by the monitoring apparatus searching device, a monitoring apparatus determining device that selects the at least one monitoring apparatus that is to monitor, based on the acquired monitoring apparatus information, a first monitor request information transmitting device that transmits monitor request information to the at least one monitoring apparatus selected by the monitoring apparatus determining device, a first monitor request result receiving device that receives a result of a monitor request from the at least one monitoring apparatus, and a registration completion information storing device operable when the received result of the monitor request is a monitoring start notification, to store registration completion information in a storage area thereof, and the monitoring apparatus comprises a monitoring apparatus information transmitting device that transmits the monitoring apparatus information to the image forming apparatus in response to the search by the monitoring apparatus searching device, a monitor request information receiving device that receives the monitor request information from the image forming apparatus, a second monitor request information transmitting device that transmits the received monitor request information to the monitoring host, a second monitor request result receiving device that receives the result of the monitor request from the monitoring host, a monitor request result transmitting device that transmits the result of the monitor request received from the monitoring host to the image forming apparatus, and a monitoring starting device operable when determining from the result of the monitor request that registration of the at least one monitoring apparatus in the monitoring host is completed, to start monitoring the image forming apparatus.

Preferably, the predetermined information includes status information and counter information of the image forming apparatus.

Preferably, the monitoring host comprises a holding device that holds image forming apparatus identification information for uniquely identifying a newly added image forming apparatus as new information, and holds detailed registration information for setting the image forming apparatus registered in the image forming apparatus monitoring system for monitoring by at least one of the monitoring apparatuses registered in the image forming apparatus monitoring system.

Preferably, the image forming apparatus monitoring system comprises a selecting device operable when a plurality of monitoring apparatuses have been detected by the detecting device, to select a plurality of monitoring apparatuses including a monitoring apparatus with a first priority and a monitoring apparatus with a second priority, and the monitoring apparatus with the second priority is operated in place of the monitoring apparatus with the first priority when a trouble occurs in the monitoring apparatus with the first priority.

To attain the above object, in a second aspect of the present invention, there is provided a monitoring method for an image forming apparatus monitoring system comprising a monitoring host, a plurality of monitoring apparatuses, at least one image forming apparatus that sends predetermined information and searches at least one monitoring apparatus from the plurality of monitoring apparatuses, and a communication line, the monitoring apparatus searched out collects the predetermined information and transmits same to the monitoring host, and the monitoring host, the monitoring apparatuses and the image forming apparatus are connected to one another via the communication line, for performing communications therebetween, comprising a holding step of holding image forming apparatus identification information for uniquely identifying a newly added image information apparatus as new information, a status determining step of determining whether or not the image forming apparatus is registered in the image forming apparatus monitoring system, an information displaying step of displaying a registration status of the image forming apparatus, a monitoring apparatus searching step of searching the at least one monitoring apparatus that is to monitor the image forming apparatus when the image forming apparatus is determined not to be registered in the status determining step, a monitoring apparatus information acquiring step of acquiring monitoring apparatus information from the at least one monitoring apparatus searched in the monitoring apparatus searching step, a monitoring apparatus determining step of selecting the at least one monitoring apparatus that is to monitor, based on the acquired monitoring apparatus information, a first monitor request information transmitting step of transmitting monitor request information to the at least one monitoring apparatus selected in the monitoring apparatus determining step, a first monitor request result receiving step of receiving a result of a monitor request from the at least one monitoring apparatus, a registration completion information storing step of storing registration completion information in a storage area when the result of the monitor request received from the monitoring apparatus is a monitoring start notification, a monitoring apparatus information transmitting step of transmitting the monitoring apparatus information to the image forming apparatus in response to the search in the monitoring apparatus searching step, a monitor request information receiving step of receiving the monitor request information from the image forming apparatus, a second monitor request information transmitting step of transmitting the received monitor request information to the monitoring host, a second monitor request result receiving step of receiving the result of the monitor request from the monitoring host, a monitor request result transmitting step of transmitting the result of the monitor request received from the monitoring host to the image forming apparatus, and a monitor starting step of starting monitoring the image forming apparatus when determining from the result of the monitor request that registration of the at least one monitoring apparatus in the monitoring host is completed.

To attain the above object, in a third aspect of the present invention, there is provided an image forming apparatus that is capable of communicating with a monitoring apparatus that collects maintenance information from an apparatus on a network and notifies a monitoring host of the collected maintenance information, comprising a detecting device that detects at least one monitoring apparatus via the network, and a selecting device that selects the monitoring apparatus detected by the detecting device as a monitoring apparatus that is to monitor the image forming apparatus.

Preferably, the image forming apparatus comprises a transmitting device that transmits monitor request information to the monitoring apparatus detected by the detecting device.

Preferably, the image forming apparatus comprises a display control device that causes a display section to display the monitoring apparatus detected by the detecting device.

More preferably, the display control device causes the display section to display the monitoring apparatus detected by the detecting device based on a predetermined criterion.

More preferably, the display control device causes the display section to display attribute information of the monitoring apparatus detected by the detecting device.

Also preferably, the attribute information includes at least one of an identifier for the monitoring apparatus, a monitor status of the monitoring apparatus, communication information of the monitoring apparatus, and an installation place of the monitoring apparatus, and the monitor status includes a list of image forming apparatuses to be monitored or a number of image forming apparatuses to be monitored.

Preferably, the image forming apparatus comprises a storing device that stores a selection condition for selecting the monitoring apparatus, and a selecting device that selects at least one monitoring apparatus from a plurality of monitoring apparatuses detected by the detecting device, based on the selection condition, and the transmitting device transmits the monitor request information to the monitoring apparatus selected by the selecting device.

More preferably, the selection condition includes a number of image forming apparatuses to be monitored by the monitoring apparatus, or a range of IP addresses thereof.

Preferably, the image forming apparatus comprises a notifying device that notifies the monitoring host of the maintenance information not via the monitoring apparatus.

To attain the above object, in a fourth aspect of the present invention, there is provided a control method for an image forming apparatus that is capable of communicating with a monitoring apparatus that collects maintenance information from an apparatus on a network and notifies a monitoring host of the collected maintenance information, comprising a detecting step of detecting at least one monitoring apparatus via the network, and a selecting step of selecting the monitoring apparatus detected in the detecting step as a monitoring apparatus that is to monitor the image forming apparatus.

Preferably, the control method comprises a transmitting step of transmitting monitor request information to the monitoring apparatus detected in the detecting step.

Preferably, the control method comprises a display control step of causing a display section to display the monitoring apparatus detected in the detecting step.

More preferably, the display control step comprises causing the display section to display the monitoring apparatus detected in the detecting step based on a predetermined criterion.

More preferably, the display control step comprises causing the display section to display attribute information of the monitoring apparatus detected in the detecting step.

Also preferably, the attribute information includes at least one of an identifier for the monitoring apparatus, a monitor status of the monitoring apparatus, communication information of the monitoring apparatus, and an installation place of the monitoring apparatus, and the monitor status includes a list of image forming apparatuses to be monitored or a number of image forming apparatuses to be monitored.

More preferably, the control method comprises a storing step of storing a selection condition for selecting the monitoring apparatus in a storing device, and a selecting step of selecting at least one monitoring apparatus from a plurality of monitoring apparatuses detected in the detecting step, based on the selection condition, and the transmitting step comprises transmitting the monitor request information to the monitoring apparatus selected in the selecting step.

Also preferably, the selection condition includes a number of image forming apparatuses to be monitored by the monitoring apparatus, or a range of IP addresses thereof.

Preferably, the control method comprises a selecting step of selecting a plurality of monitoring apparatuses including a monitoring apparatus with a first priority and a monitoring apparatus with a second priority when a plurality of monitoring apparatuses have been detected in the detecting step, and the monitoring apparatus with the second priority is operated in place of the monitoring apparatus with the first priority when a trouble occurs in the monitoring apparatus with the first priority.

More preferably, the control method comprises a notifying step of notifying the monitoring host of the maintenance information not via the monitoring apparatus.

To attain the above object, in a fifth aspect of the present invention, there is provided a program product for causing a computer to execute a control method for an image forming apparatus that is capable of communicating with a monitoring apparatus that collects maintenance information from an apparatus on a network and notifies a monitoring host of the collected maintenance information, comprising a detecting module for detecting at least one monitoring apparatus via the network, and a selecting module for selecting the monitoring apparatus detected by the detecting module as a monitoring apparatus that is to monitor the image forming apparatus.

The above and other objects, features, and advantages of the present invention will be apparent from the following description taken in conjunction with the accompanying drawings, in which like reference characters designate the same or similar parts throughout the figures.

BRIEF DESCRIPTION OF THE DRAWINGS

FIGS. 9A and 9B are diagrams showing information tables in a database managed by the monitoring apparatus, in which:

FIG. 9A shows an information table of multi-function machine IDs and IP addresses of multi-function machines to be monitored; and FIG. 9B shows an information table of the number of multi-function machines to be monitored;

FIG. 12 is information transmitted together with a monitor service registration request.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
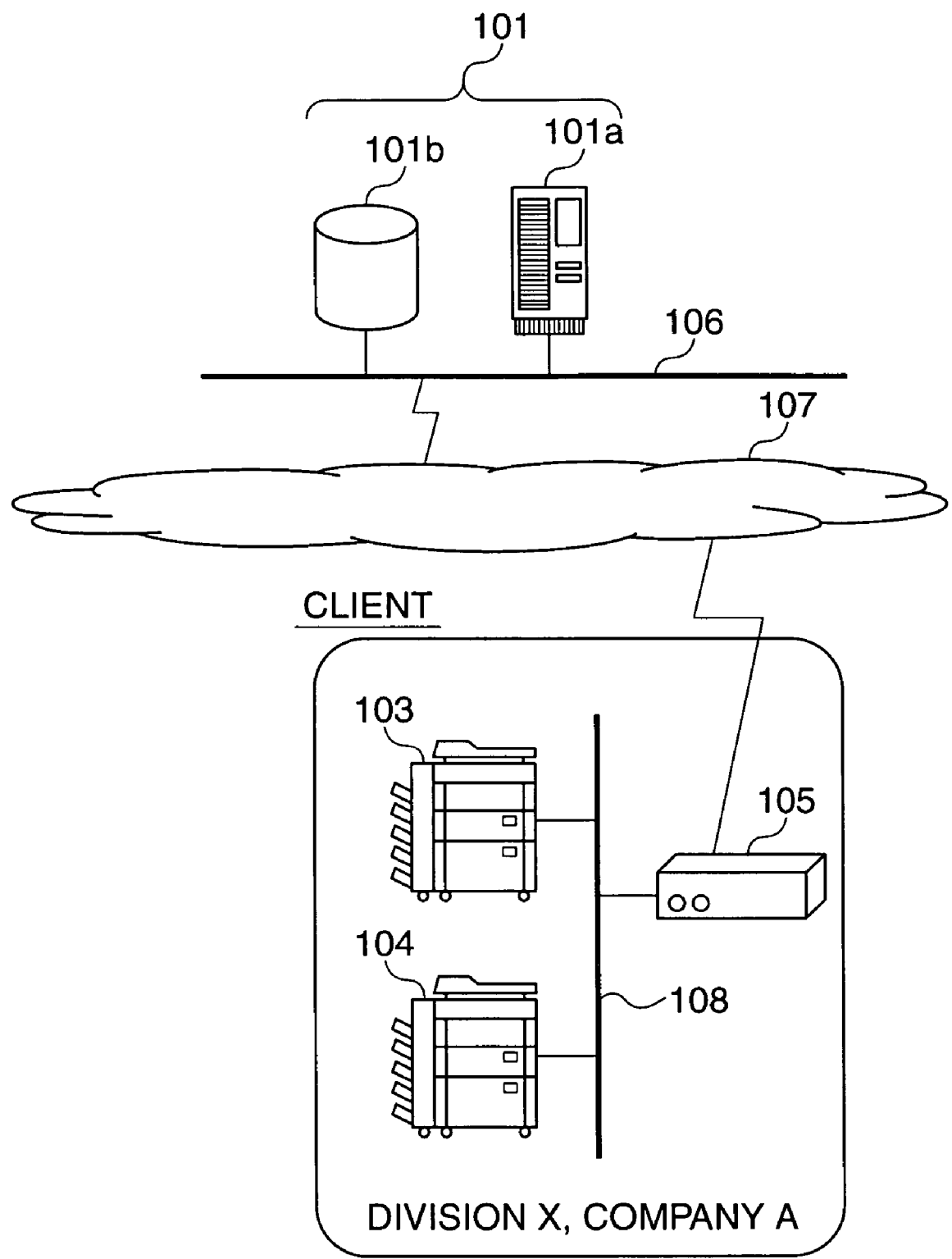
FIG. 1 is a diagram showing the entire configuration of an image forming apparatus monitoring system according to a first embodiment of the present invention.

FIG. 1 is diagram showing the entire configuration of an image forming apparatus monitoring system according to a first embodiment of the present invention.

As shown in FIG. 1, the present image forming apparatus monitoring system is comprised of a monitoring host 101, which is comprised of a management server 101a and a database 101b, multi-function machines 103 and 104 as image forming apparatuses, a monitoring apparatus 105 which monitors the multi-function machines 103 and 104, a LAN (Local Area Network) 106, 108 and a communication line 107 such as the Internet.

The multi-function machines 103 and 104, the monitoring apparatus 105 and the LAN 108 constitute a network system installed at a client's site (for example, Division X, Company A).

Although not shown in FIG. 1, a plurality of personal computers (information processing apparatuses) of a known construction which are capable of inputting print data to the multi-function machines 103 and 104 exist on the LAN 108.

These personal computers are identical in configuration with an ordinary information processing apparatus, and have the same hardware configuration as a monitoring apparatus in FIG. 7, which will be described later.

Figure 2:
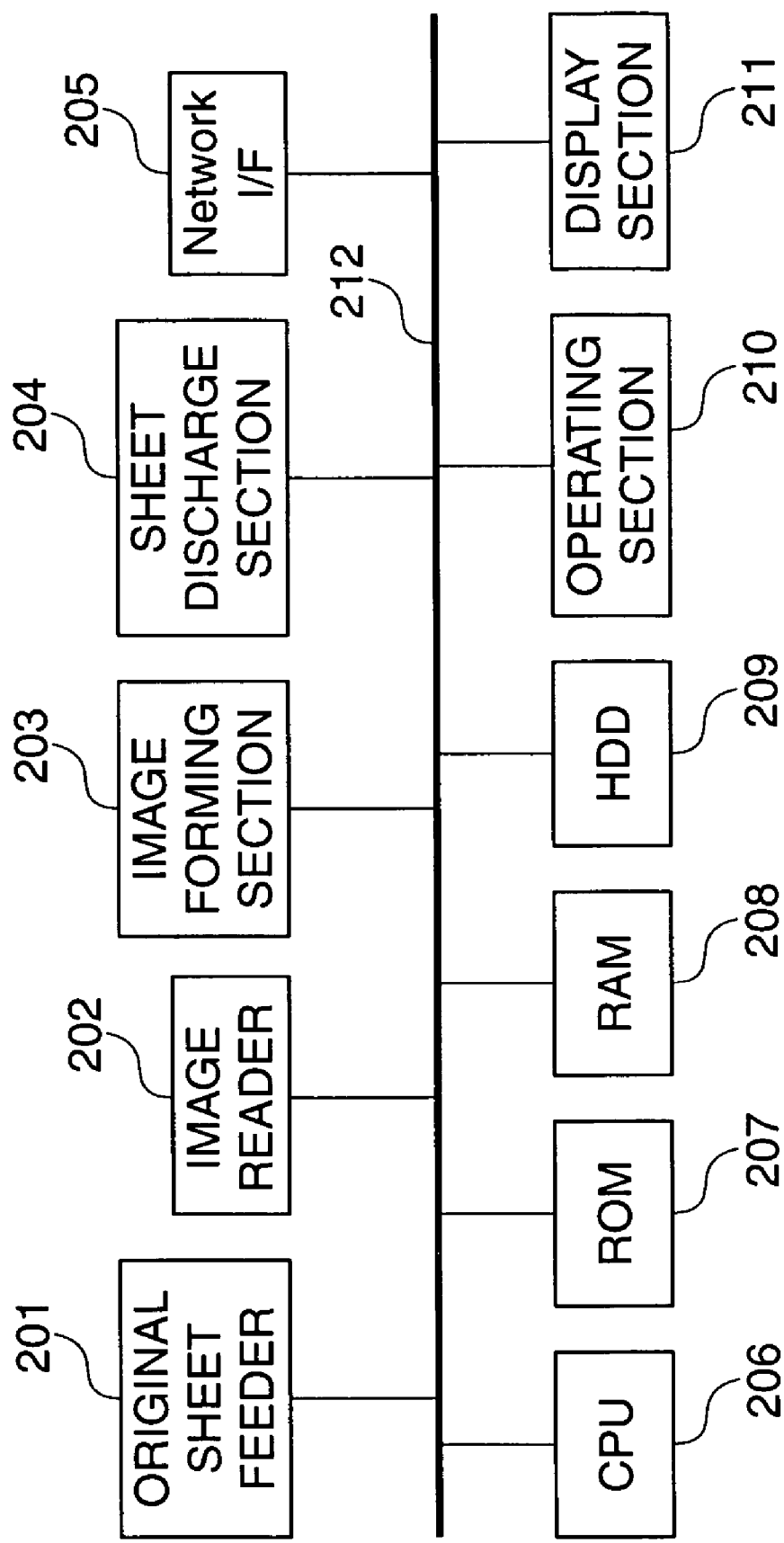
FIG. 2 is a block diagram showing the hardware configuration of multi-function machines appearing in FIG. 1.

FIG. 2 is a block diagram showing the hardware configuration of the multi-function machines in FIG. 1. FIG. 2 shows an ordinary hardware configuration of the multi-function machines as one example of the image forming apparatus. The multi-function machines 103 and 104 have the same hardware configuration, and therefore the multi-function machine 103 will be described.

As shown in FIG. 2, the multi-function machine 103 is comprised of an original sheet feeder 201, an image reader 202 which reads an original document, an image forming section 203 which converts the read original image date and received data into print images and prints them on sheets, a sheet discharge section 204 which discharges printed sheets and performs processing such as sorting and stapling, a network I/F 205 which connects to the LAN or the Internet and carries out data communication with external apparatuses, a CPU 206 which controls the entire multi-function machine 103, a ROM 207 which stores programs and data relating to processes carried out by the multi-function machine 103, a RAM 208 which is capable of electrically storing temporary data relating to processes carried out by the multi-function machine 103 and is rewritable, a readable and writable HDD 209 which stores programs and data relating to processes carried out by the multi-function machine 103, and user data and the like which are transmitted to the multi-function machine 103, an operating section 210 which receives instructions input to the multi-function machine 103, and a display section 211 which displays information relating to the operative status of the multi-function machine 103 and operations input to the operating section 210. These components are connected to one another via a system bus 212 to exchange data.

Figure 3:
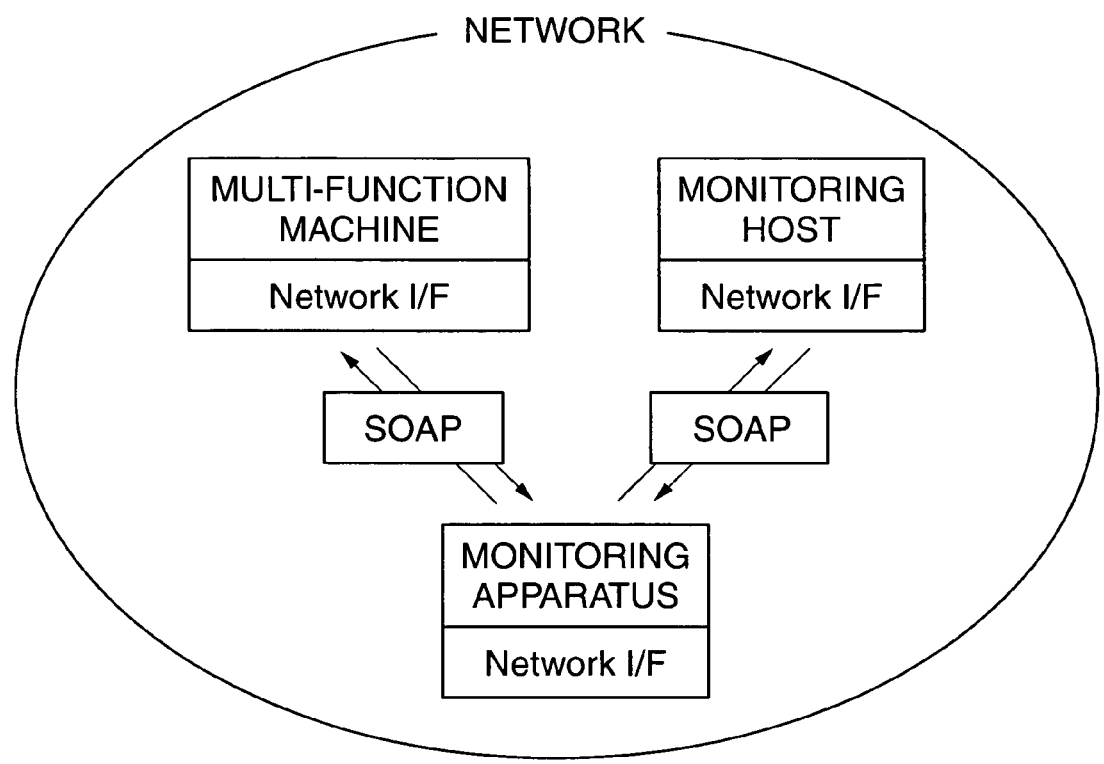
FIG. 3 is a diagram showing the status of data communications in the image forming apparatus monitoring system in FIG. 1.

FIG. 3 is a diagram showing the status of data communications in the image forming apparatus monitoring system in FIG. 1. In the present embodiment, exchange of data between the multi-function machines 103 and 104 and the monitoring apparatus 105, and between the monitoring host 101 and the monitoring apparatus 105 is performed using SOAP (Simple Object Access Protocol).

A SOAP module including a SOAP message creating section which creates a SOAP message and a SOAP message analyzing section which interprets the SOAP message is installed in each of the multi-function machines 103 and 104, the monitoring apparatus 105, and the monitoring host 101. In the multi-function machines 103 and 104, the CPU 206 executes a SOAP program stored in the ROM 207 or the HDD 209, to thereby create a module for carrying out processing relating to the SOAP. This also applies to the monitoring apparatus 105 and the monitoring host 101.

The multi-function machines 103 and 104 use the SOAP to acquire monitoring apparatus information from the monitoring apparatus 105 and issue a monitor service registration request for a multi-function machine which is newly added or installed. The monitoring apparatus 105 receives the monitor service registration request from either of the multi-function machines and transmits the same to the monitoring host 101 as it is. Then, the monitoring apparatus 105 receives a result of registration in response to the request from the monitoring host 101 and transmits the result to the multi-function machine. These communications are also performed using the SOAP. Information which is transmitted to the monitoring apparatus 105 together with the monitor service registration request is shown in FIG. 12.

Figure 4:
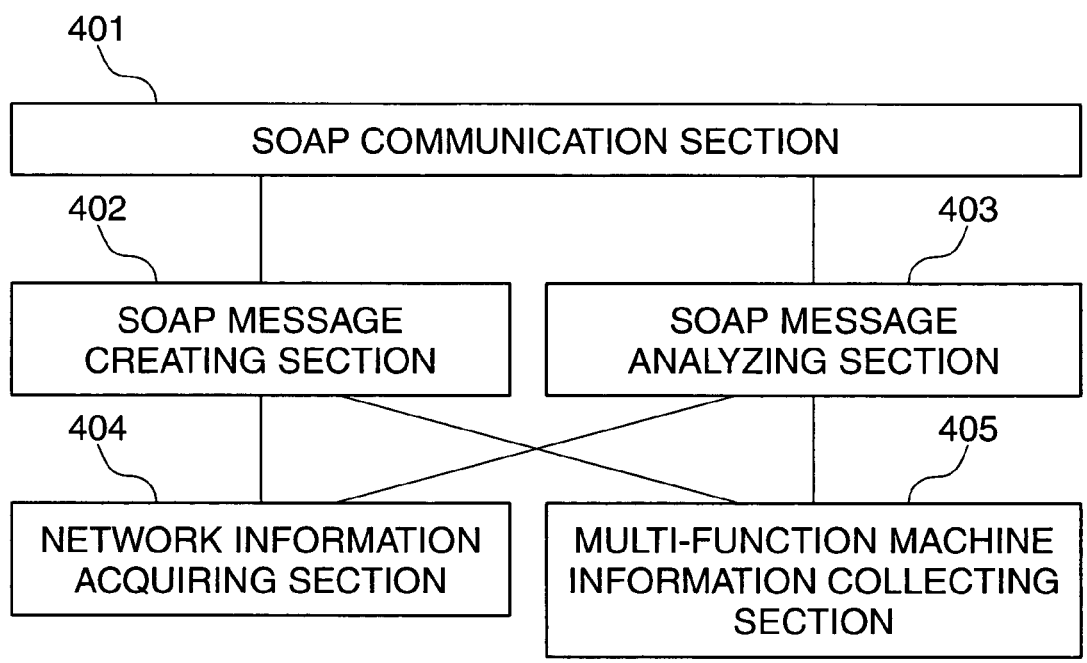
FIG. 4 is a block diagram showing the configuration of a SOAP module in a multi-function machine.

FIG. 4 is a block diagram showing the configuration of the SOAP module in the multi-function machines 102 and 103. As described above, the SOAP module including the SOAP message creating section which creates the SOAP messages, and the SOAP message analyzing section which interprets the SOAP messages are installed in each of the multi-function machines 103 and 104, the monitoring apparatus 105, and the monitoring host 101, and the SOAP module installed in the multi-function machine 103 or 104 will be described.

As shown in FIG. 4, a SOAP communication section 401 transfers SOAP data (SOAP message) which is received from the monitoring apparatus 105 via the network I/F 205 to the SOAP message analyzing section 403, and transmits SOAP data which is created by the SOAP message creating section 402 to the monitoring apparatus 105 via the network I/F 205.

A network information acquiring section 404 acquires network information inputted via the operating section 210 and stored in the HDD 209. A multi-function machine information collecting section 405 acquires counter information stored therein in accordance with a schedule managed inside the present multi-function machine, or by an instruction from the monitoring apparatus 105. The multi-function machine information collecting section 405 acquires and monitors status information such as service calls, jam, and toner exhaustion occurring inside the multi-function machine. The acquired status information data is transferred to the SOAP message creating section 402 and is then transmitted to the monitoring apparatus 105, or is stored, interpreted and processed in the multi-function information collecting section 405, followed by being transferred to the SOAP message creating section 402 and then transmitted to the monitoring apparatus 105.

Figure 5:
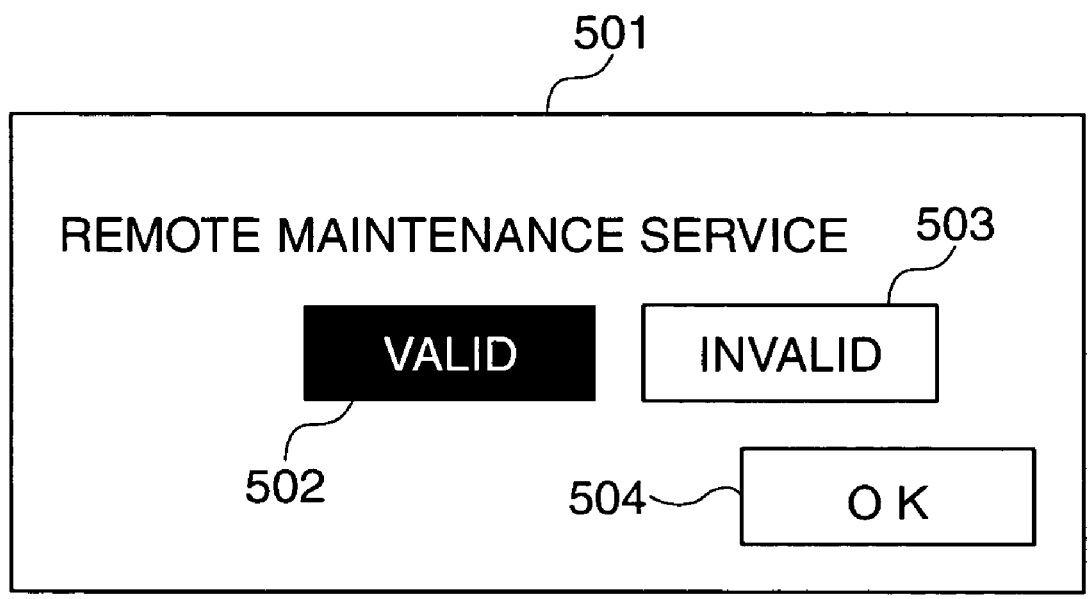
FIG. 5 is a view showing a registration setting screen for registering a multi-function machine in the image forming apparatus monitoring system displayed on a display section of the multi-function machine.

FIG. 5 is a view showing a registration setting screen for registering a multi-function machine in the image forming apparatus monitoring system, which is displayed on the display section of the multi-function machine. Whether to register a multi-function machine 103 newly added or installed in the monitoring system is set on the registration setting screen 501 (remote maintenance service screen) shown in FIG. 5. When it is possible to perform a remote operation from an apparatus having a remote function such as the monitoring host 101, a personal computer, and another multi-function machine existing on the LAN 106, 108, the registration setting screen 501 shown in FIG. 5 is displayed on the apparatus having the remote function, and settings may be performed on the registration setting screen in FIG. 5 from the apparatus.

As shown in FIG. 5, the user selects a valid button 502 or an invalid button 503, and depresses an OK button 504, whereby the setting selected at this time is stored in the HDD 209. Selection of the valid button 502 means that the newly added or installed multi-function machine is to be registered in the image forming apparatus monitoring system, and selection of the invalid button 503 means that the multi-function machine is not to be registered in the image forming apparatus monitoring system.

Figure 6:
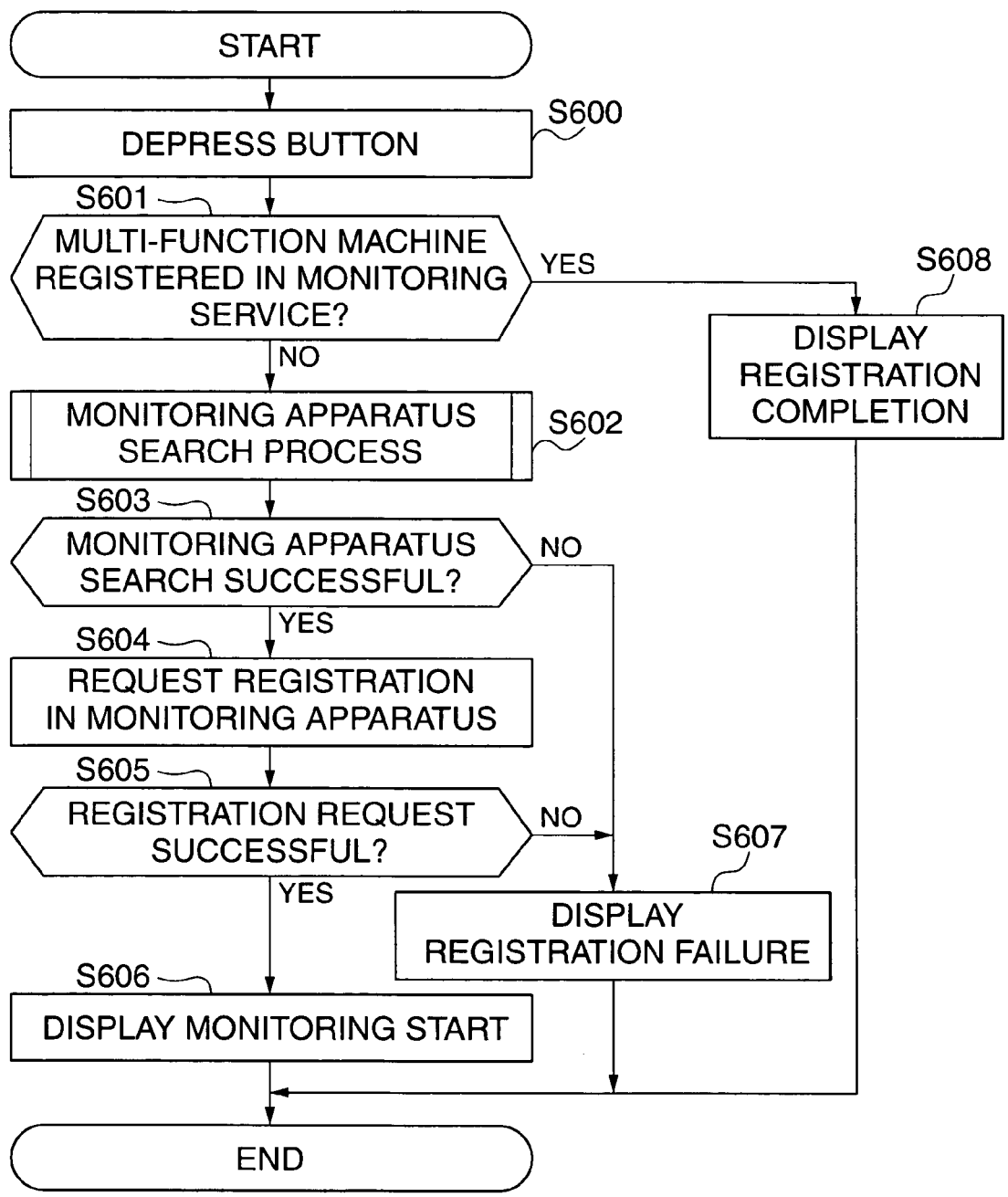
FIG. 6 is a flowchart showing an operation process carried out by the multi-function machine.
Figure 7:
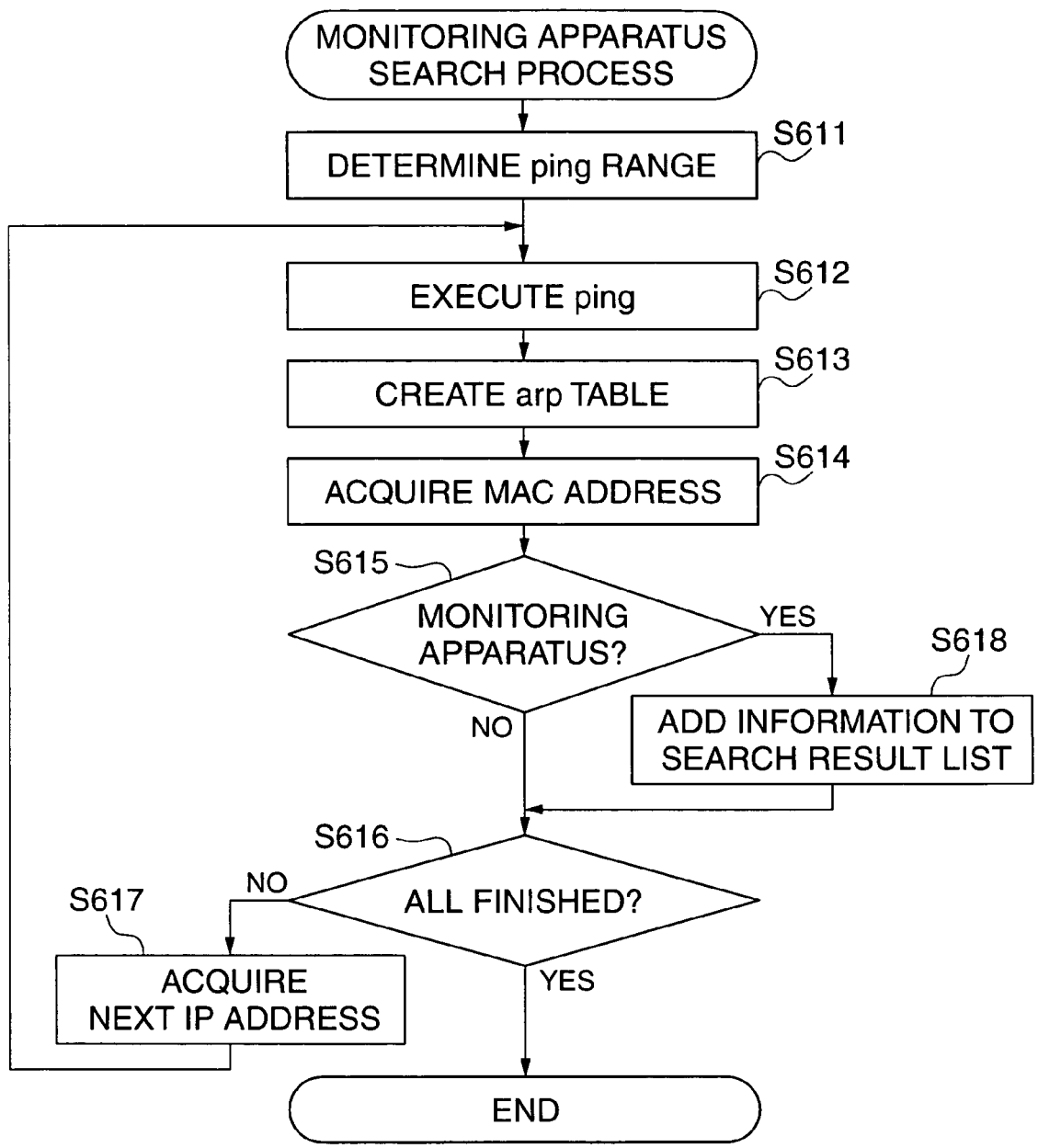
FIG. 7 is a flowchart showing details of a monitoring apparatus search process in a step S602 in FIG. 6.

FIGS. 6 and 7 are flowcharts showing an operation process carried out by the multi-function machine.

This process is executed on the premise that identification information for uniquely identifying the newly added multi-function machine is registered and stored in the database 101b of the monitoring host 101 as new information. As the identification information for identifying the multi-function machine, for example, a multi-function machine ID comprised of a MAC address which is uniquely assigned to each multi-function machine during manufacture is used. This identification information is managed on the database 101b as the multi-function machine ID.

The multi-function machine has a connection function of connecting to the LAN and the Internet via the network I/F 205. Therefore, in the installing operation of the multi-function machine 103 which is newly added, it is necessary to perform network-related settings including setting of an IP address (Internet Protocol address) for the multi-function machine. To perform network settings for the multi-function machine, a method may be used in which settings are carried out by a manual operation via the operating section 210, for example. When the network environment of the client uses DHCP (Dynamic Host Configuration Protocol), it is possible to automatically acquire network setting information from the LAN or the like to perform settings. By the above described operation, the client can use the multi-function machine.

In FIG. 6, the multi-function machine displays the registration setting screen 501 on the display section 211, and receives inputs by a service man or the user. The valid button 502 is selected on the registration setting screen 501 and the OK button 504 is depressed, whereby the process for registering the multi-function machine in the monitoring service (remote maintenance service) is started (step S600).

In a step S601, it is confirmed whether or not the multi-function machine 103 is already registered in the monitoring service. Once the multi-function machine 103 has been registered in the monitoring service, history information of completed registrations (registration completion information) is written into a storage area of the HDD 209 of the multi-function machine when a monitoring start notification is issued to the multi-function machine from the monitoring apparatus 105. Therefore, when the valid button 502 is selected on the registration setting screen 501 displayed on the display section 211, and the OK button 504 is depressed, the multi-function machine 103 refers to the registration completion information in the storage area of the HDD 209, and determines whether or not the multi-function machine is registered, namely, whether the monitor service is valid or invalid.

When the monitor service is valid (registered) as a result of the determination in the step S601 (YES in the step S601), a message indicating that the monitor service is valid is displayed on the display section 211 of the multi-function machine instead of the registration setting screen 501 (step S608), the process is terminated.

On the other hand, when the monitor service is invalid (unregistered) (NO to the step S601), monitoring apparatus search processing is carried out to detect a monitoring apparatus existing on the network (step S602). Here, for example, ping sweep is performed on the same subnet as the multi-function machine, the vender (manufacturer) of the machine is determined by a MAC address acquired from an ARP cache which is created when a response to the ping sweep is received, and the monitoring apparatus 105 corresponding to the multi-function machine is searched out. Then, a monitoring apparatus information request is transmitted to the monitoring apparatus 105, to acquire the monitoring apparatus information.

The method of acquiring the monitoring apparatus information on the LAN is performed using the SOAP as described above, but the method described above as an example in the step S602 is not limitative and any method in which the multi-function machines 103 and 104 and the monitoring apparatus 105 can recognize each other and the monitoring apparatus 105 can respond to a search request for a multi-function machine may be used. The process of the step S602 is shown in detail in FIG. 7.

Now, the step S602 will be described more specifically. When, for example, the IP address of the installed multi-function machine is "197.71.2.04", and the subnet mask address is "255.255.255.0", "197.71.2.XX (XX is in a range of 1 to 254)" is determined as a network address range within which ping sweep is to be performed (step S611).

Then, ping sweep is executed with respect to the individual IP addresses within the range determined in the step S611 (step S612). When a response to the ping sweep is received, an ARP cache (ARP table) is automatically created for the lower bits of the IP address (step S613).

The monitoring apparatus 105 is identified based on the created ARP cache. Several identifying methods will be described hereinafter.

(1) When the more significant n digits of the MAC address (n+m digits) which is acquired from the ARP cache indicates a certain vendor, and the monitoring apparatus 105 is assigned to the range of the lower significant m digits.

In this case, it is determined whether or not the significant m digits of the MAC address included in the ARP cache is assigned to the monitoring apparatus 105, to thereby identify the monitoring apparatus 105.

(2) When the vendor and the kind of device (a monitoring apparatus or a multi-function machine, for example) cannot be determined from the MAC address.

The kinds of apparatuses provided by each vendor may include, for example, not only the monitoring apparatus 105 but also a multi-function machine. In such a case, the vendor can be identified from only the MAC address, but it is impossible to discriminate between the monitoring apparatus 105 and the multi-function machine. Therefore, first, the vendor is identified from the MAC address, and thereafter, inquires are sequentially made of apparatuses of the vendor as to whether or not each of the apparatuses is the monitoring apparatus 105. In this case, if a response is received to the effect that the apparatus is the monitoring apparatus 105, the multi-function machine determines that the apparatus of which an inquiry was made is the monitoring apparatus 105, while when a response is received to the effect that the apparatus is not the monitoring apparatus 105 or no response is received, the multi-function machine determines that the apparatus of which an inquiry was made is not the monitoring apparatus 105.

In a step S614, when the first MAC address is acquired by reading from the created ARP cache, it is determined whether or not the apparatus determined from the MAC address is the monitoring apparatus 105 by either of the aforementioned methods (1) and (2), for example (step S615).

When the answer to the step S615 is YES, monitoring apparatus information (including at least the MAC address and the IP address) corresponding to a MAC address acquired immediately before is added to a search result list (step S618). On the other hand, when the answer to the step S615 is NO, it is determined whether or not all the MAC addresses included in the ARP cache have been acquired in a step S616. When the answer to the step S616 is NO, the next IP address is acquired in a step S617, and the step S612 and the subsequent steps are repeated.

On the other hand, when the answer to the step S616 is YES, the process is terminated, and the process proceeds to a step S603 and the subsequent steps in FIG. 6.

In the above-described way, the provision of the process of the step S602 facilitates search and discovery of the monitoring apparatus in an environment where various apparatuses are connected on the network, whereby an installing operation load upon an installer such as a service man can be largely reduced.

Following the step S602, based on the monitoring apparatus information acquired as above, one of a plurality of monitoring apparatuses 105 is selected in accordance with a predetermined selection condition as a monitoring apparatus which should perform monitoring.

When one or a plurality of monitoring apparatuses 105 which should perform monitoring have been successfully searched out from the result of the search for the monitoring apparatus in the step S602, and it is determined which monitoring apparatus should perform monitoring (YES to the step S603), a request for registration of a multi-function machine in the monitor service is issued to the determined monitoring apparatus (step S604). When this registration request is issued, the multi-function machine information and the monitoring apparatus information are transmitted together with the registration request to the monitoring apparatus from the multi-function machine.

When the multi-function machine has detected a plurality of monitoring apparatuses in the step S602, any monitoring apparatus may be selected from the plurality of monitoring apparatuses which have been detected, in accordance with a monitoring apparatus selection condition stored in the HDD 209. Examples of the monitoring apparatus selection conditions include a condition that the number of multi-function machines to be monitored in the monitoring apparatus should be smaller than a predetermined value, and a condition that the IP address range of the monitoring apparatus should fall within a predetermined range. If necessary, other conditions may be adopted.

Thereafter, the result of registration in response to the registration request is received from the monitoring apparatus, and when the registration request results in failure (NO to a step S605), the multi-function machine displays "registration failure" on the screen of the display section 211 (display) in a step S607. On the other hand, when the registration request results in success, and the result of the registration request is registration completion or monitor start notification (YES to the step S605), the multi-function machine displays "monitor start" on the display section 211 (step S606).

The multi-function machine is provided with a function of notifying the monitoring host 101 of the maintenance information using SOAP, not via the monitoring apparatus 105, and when no monitoring apparatus is detected, this function may be used.

Figure 8:
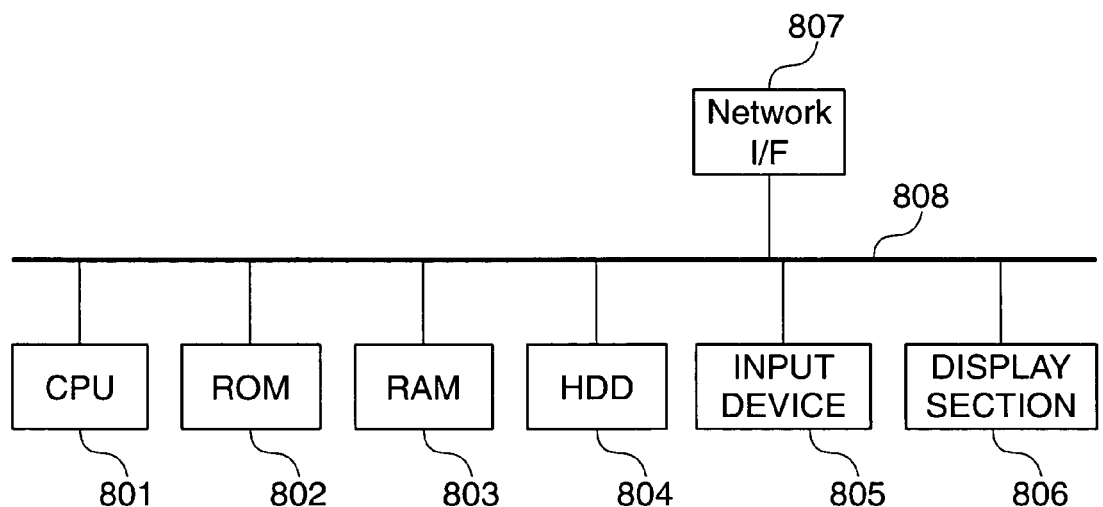
FIG. 8 is a block diagram showing the hardware configuration of a monitoring apparatus appearing in FIG. 1.

FIG. 8 is a diagram showing the hardware configuration of the monitoring apparatus 105 in FIG. 1.

As shown in FIG. 8, the monitoring apparatus 105 is comprised of a CPU 801 which controls the entire apparatus, a ROM 802 which stores programs and data relating to processes carried out by the present apparatus, a RAM 803 which can electrically store temporary data relating to processes carried out by the present apparatus, and is rewritable, a readable and writable HDD 804 which stores programs and data relating to processes carried out by the present apparatus, temporally data, information relating to one or more multi-function machines to be monitored, and information collected from the multi-function machine(s), an input device 805 which is comprised of a key board, and a pointing device and receives instructions input to the present apparatus, a display section 806 which displays the operative status of the present apparatus and information which is outputted from programs operated on the present apparatus, and a network I/F 807 which connects to the LAN and the Internet and performs data communications with external apparatuses. These components are connected to one another via a system bus 808 to exchange data.

FIGS. 9A and 9B are diagrams each showing part of information tables in a database managed by the monitoring apparatus. The information tables are part of information which is sent to the multi-function machine from the monitoring apparatus in response to the search request from the multi-function machine in the step S602 in FIG. 6, referred to above.

The monitoring apparatus 105 stores in the HDD 804 the information table of multi-function machine IDs and IP addresses of multi-function machines to be monitored as shown in FIG. 9A, and the information table of the number of multi-function machines to be monitored as shown in FIG. 9B.

Figure 10:
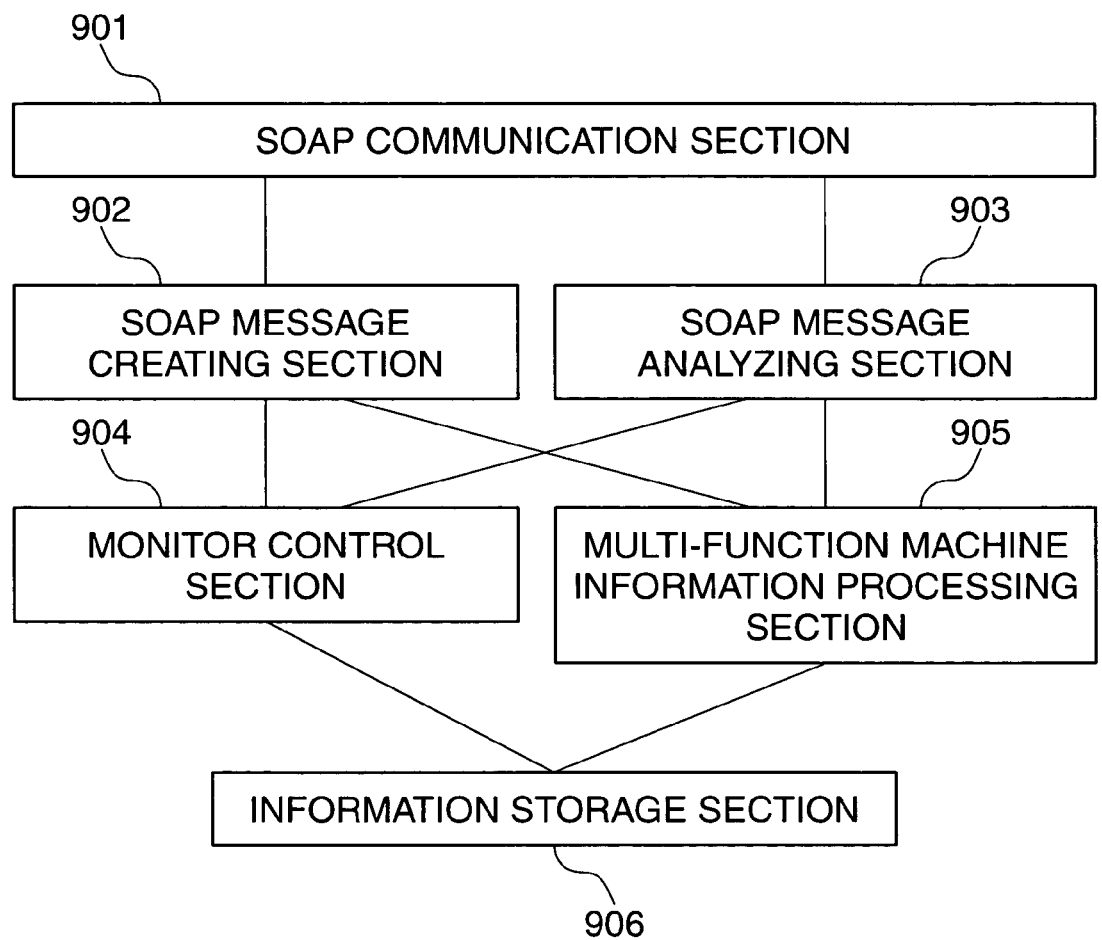
FIG. 10 is a diagram showing the configuration of a SOAP module in the monitoring apparatus.

FIG. 10 is a diagram showing the configuration of the SOAP module of the monitoring apparatus 105. FIG. 10 shows only the software configuration of a part of the SOAP module relating to the image forming apparatus monitoring system.

As shown in FIG. 10, a SOAP communication section 901 transfers SOAP data received from the monitoring host 101 or the multi-function machines 103 and 104 via the network I/F 707, to a SOAP message analyzing section 903, and also transmits SOAP data created by a SOAP message creating section 902 to the multi-function machines 103 and 104 via the network I/F 707.

A monitor control section 904 responds to a monitoring instruction from the monitoring host 101, updates monitored multi-function machine information stored in an information storage section 906, and performs schedule management to acquire information of the multi-function machines 103 and 104. A multi-function machine information processing section 905 operates in accordance with a schedule managed by the monitor control section 904 or in response to an instruction from the monitoring host 101 to store counter information, and status information such as service calls, jam, and toner exhaustion positively collected by the present apparatus from the multi-function machines 103 and 104 in the information storage section 906.

The data stored in the information storage section 906 is transferred to the SOAP message creating section 902 as it is via the multi-function machine information processing section 905 to be transmitted to the monitoring host 101, or the data is interpreted and processed by the multi-function machine information processing section 905, and is transferred to the SOAP message creating section 902 to be transmitted to the monitoring host 101.

Figure 11:
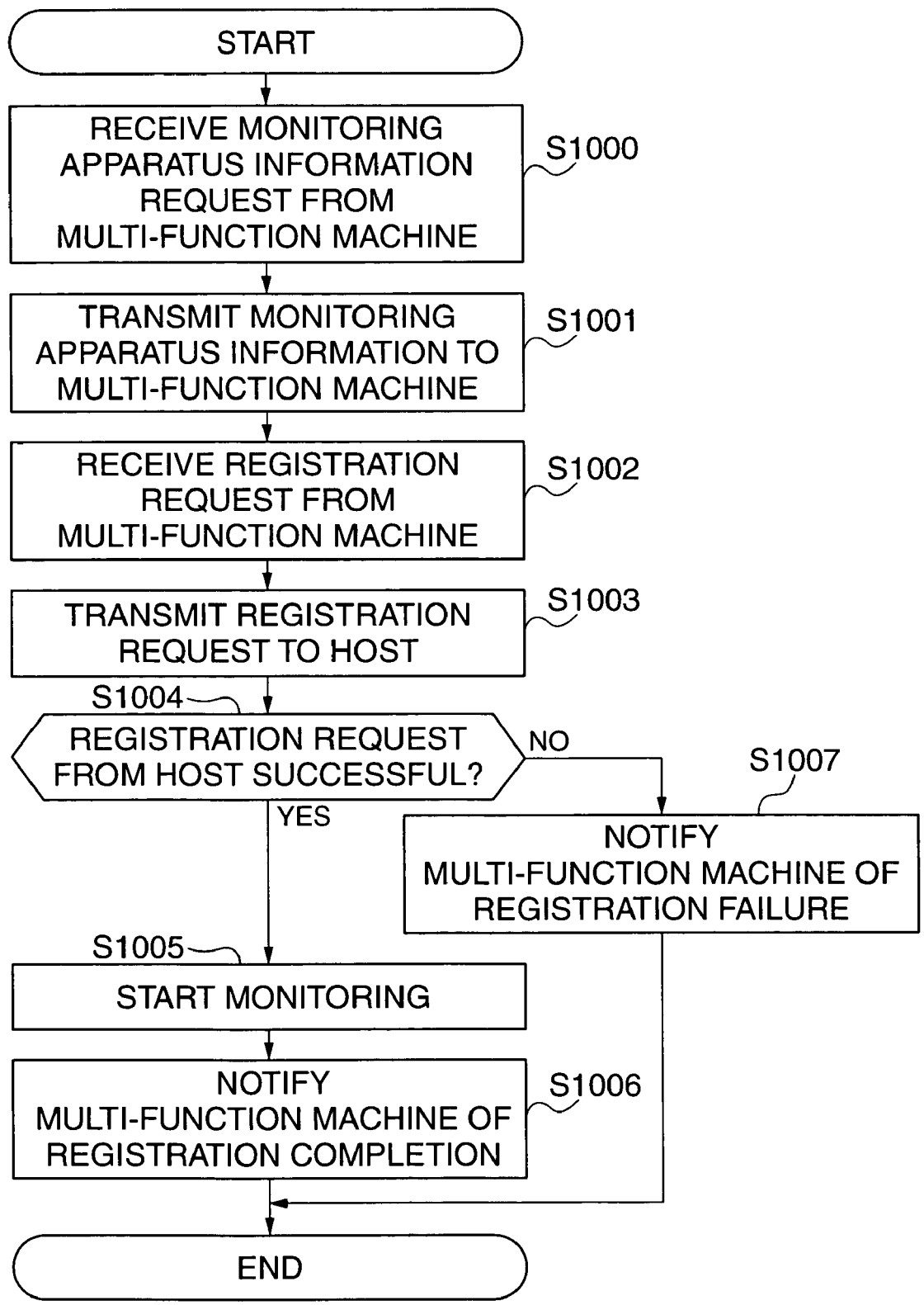
FIG. 11 is a flowchart showing an operation process carried out by the monitoring apparatus.

FIG. 11 is a flowchart showing an operation process carried out by the monitoring apparatus.

In FIG. 11, when receiving a monitoring apparatus information request from a multi-function machine according to the process of the step S602 (step S1000), the monitoring apparatus 105 transmits the monitoring apparatus information to the multi-function machine (step S1001). The monitoring apparatus information transmitted to the multi-function machine includes the management information in FIGS. 9A and 9B.

Subsequently, the monitoring apparatus 105 receives a new registration request together with the multi-function machine information and the monitoring apparatus information from a multi-function machine (step S1002), and transmits the registration request to the monitoring host 101 (step S1003). On this occasion, the monitoring apparatus 105 transmits the multi-function machine information received from the multi-function machine and the monitoring apparatus information together. The information transmitted to the monitoring host 101 in the step S1003 is temporarily stored in the HDD 804 in the monitoring apparatus 105 as the transmission source and a storage section in the monitoring host 101 as the transmission destination.

Next, in a step S1004, it is determined whether or not the registration request has resulted in success, from the result of the registration request received from the monitoring host 101. The notification of the result of the registration request to the monitoring apparatus 105 from the monitoring host 101 may be performed in real time by automatic processing based on a comparison between the monitoring apparatus 105 and the multi-function machine by the monitoring host 101 in response to the processing of the step S1002. Alternatively, the operator of the monitoring host 101 may visually confirm the content of the registration request of the step S1003 via a display section or the like, and then notify the monitoring apparatus 105 as the transmission source, of the result of the registration request from the monitoring host 101 via an operation of an input section thereof.

When it is determined from the result of the registration request that the registration has been successfully made (YES to the step S1004), monitoring of the multi-function machine to be monitored is started (step S1005), and the multi-function machine is notified of completion of the registration together with the result of the registration request (step S1006).

On the other hand, when it is determined from the result of the registration request that the registration has failed (NO to the step S1004), the multi-function machine is notified of the registration failure (step S1007). Here, causes for registration failure include, for example, a case where the system on the monitoring host 101 side is down, and a case where the information of the multi-function machine and the monitoring apparatus of which the monitoring host 101 was notified is incorrect.

As described above, according to the present embodiment, when a multi-function machine determines that it is not registered in the image forming apparatus monitoring system, the multi-function machine searches for a monitoring apparatus 105 which matches the multi-function machine, and selects the monitoring apparatus 105 which is to monitor the multi-function machine, based on monitoring apparatus information acquired from the searched monitoring apparatus 105 automatically or manually. When receiving a notification of the start of monitoring from the selected monitoring apparatus 105, the multi-function machine stores the notification in the storage area as registration completion information. On the other hand, the monitoring apparatus 105 transmits monitor request information received from the multi-function machine to the monitoring host 101, and starts monitoring the multi-function machine when determining from the result of the monitor request that registration of the multi-function machine in the monitoring host 101 is completed. As a result, a newly added multi-function machine is automatically registered in the monitoring host and can receive the image forming apparatus monitoring service. Therefore, the installing operation load for installing the multi-function machine (image forming apparatus) by the client, including a load for settings relating to the monitoring apparatus, can be reduced.

Since the newly added multi-function machine searches a monitoring apparatus for itself, the load on the monitoring apparatus and the monitoring host is reduced. After a new multi-function machine is purchased, the multi-function machine can receive the service merely by turning on power supply and performing settings for starting the monitor service on a display device thereof. Further, even if a change of the monitoring host occurs, the monitoring apparatus is notified of information of the change by the monitoring host, and the multi-function machine is notified of the information by the monitoring apparatus, and therefore, no change in settings in the multi-function machine is required.

Next, a second embodiment of the present invention will be described.

In the above described first embodiment, it is automatically determined which monitoring apparatus should monitor the multi-function machine in the process in FIG. 6, but the determination may be carried out semi-automatically instead of the automatic determination. In the second embodiment, the result of detection of the monitoring apparatus 105 by search is displayed on the display section 211 of the multi-function machine by the CPU 206 in such a manner that the monitoring apparatus 105 can be selected, and the service man is allowed to determine the monitoring apparatus 105 based on the display.

For example, a monitoring apparatus 105 that satisfies a predetermined criterion among a plurality of detected monitoring apparatuses 105 may be highlighted or may be preferentially displayed on an upper row of list of monitoring apparatuses. This facilitates selection of the monitoring apparatus by the service man. Alternatively, a monitoring apparatus 105 which has been already registered for monitoring a smaller number of multi-function machines than a predetermined number may be preferentially displayed on the display section 211, whereby the service man can select a monitoring apparatus 105 which can afford to monitor additional multi-function machines.

Further alternatively, information on attributes of detected monitoring apparatus(es) 105 may be displayed on the display section 211 in a list including indications enabling identification of the monitoring apparatuses, whereby the service man can select a more suitable monitoring apparatus. The attributes include, for example, an identifier, a monitor status, an IP address (communication information), and an installation place of the monitoring apparatus 105.

In particular, by displaying the installation place on the display section 211 as the attribute information of the detected monitoring apparatus(es) 105, the service man can select a monitoring apparatus 105 which is geographically located near the multi-function machine. By displaying how many monitored apparatuses (multi-function machines or image forming apparatuses) are registered for each monitoring apparatus 105, the service man can select a more suitable monitoring apparatus 105. By adopting one of the above selecting methods, when a plurality of monitoring apparatuses are connected under the network environment, a multi-function machine which is newly added to the monitoring system can be easily selected for monitoring a more suitable monitoring apparatus.

Next, a third embodiment of the present invention will be described.

In the first and second embodiments described above, a single suitable monitoring apparatus is selected from a plurality of monitoring apparatuses. However, this is not limitative. In the third embodiment, from the search result of the step S602 in FIG. 6, a plurality of monitoring apparatuses are selected with different priorities assigned thereto.

In the present embodiment, the monitoring apparatus with the first priority corresponds to the monitoring apparatuses selected for monitoring in the first and the second embodiments. The monitoring apparatuses with the second subsequent priorities are operated as substitute monitoring apparatuses for the apparatus with the first priority when a trouble occurs in the monitoring apparatus with the first priority, such as failure of the communication function. Hereinafter, a specific example of the present embodiment will be described with reference to FIG. 13.

Figure 13:
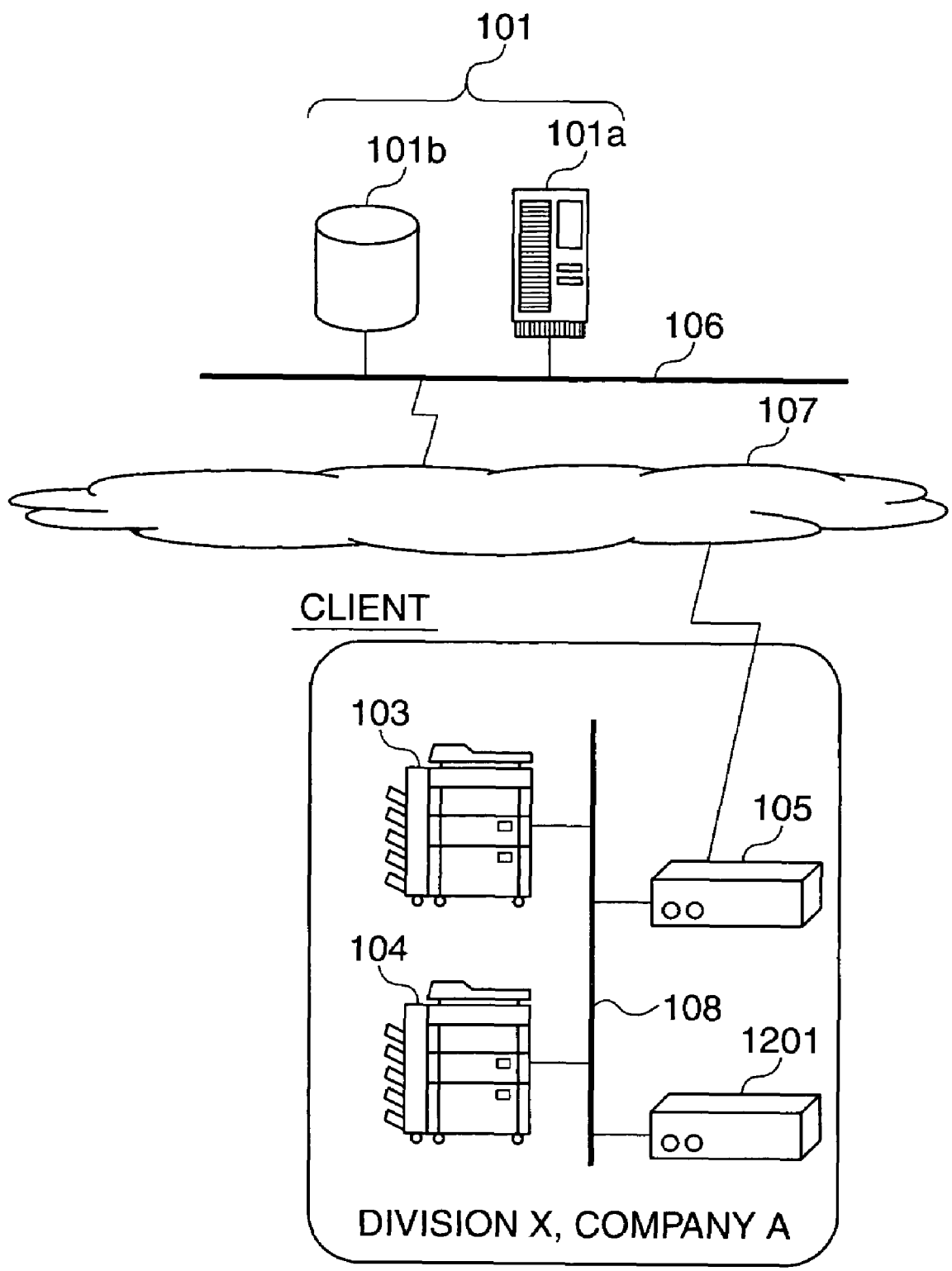
FIG. 13 is a diagram showing the entire configuration of an image forming apparatus monitoring system according to a third embodiment of the present invention.

FIG. 13 is a diagram showing the entire configuration of an image forming apparatus monitoring system according to the third embodiment.

It is assumed that the multi-function machine 103 has selected two monitoring apparatuses 105 and 1201 with different priorities. In this case, the monitoring apparatus 105 corresponds to the monitoring apparatus with the first priority, and the monitoring apparatus 1201 corresponds to the monitoring apparatus with the second priority.

Here, when there has been no transmission instruction (request) for transmission of the counter information or the like to the monitoring apparatus 105 for a predetermined time period, the multi-function machine 103 requests the monitoring apparatus with the second priority to monitor the multi-function machine 103 itself in place of the monitoring apparatus with the first priority. The monitoring apparatus 1201 which has received the request collects various kinds of information such as the counter information and the status information from the multi-function machine 103, and notifies the monitoring host 101 of the collected information via the SOAP communication section 901, in place of the monitoring apparatus 105.

According to the third embodiment, even when the monitoring apparatus 105 does not function due to a trouble in the communication function, the monitoring apparatus 1201 can be allowed to perform the functions of the monitoring apparatus 105 in place of the monitoring apparatus 105, and therefore, a 24-hour monitoring system can be more reliably established.

Although in each of the above described embodiments, communications are performed using SOAP, it goes without saying that the present invention can be also achieved by using SMTP (Simple Mail Transfer Protocol) or other protocols.

It is to be understood that the object of the present invention may be also accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Applications Nos. 2004-182450 filed Jun. 21, 2004, and 2005-155744 filed May 27, 2005, which is hereby incorporated by reference herein.

What is claimed is:

1. An image forming apparatus monitoring system comprising a monitoring host, a plurality of monitoring apparatuses, at least one image forming apparatus that sends predetermined information and searches at least one monitoring apparatus from said plurality of monitoring apparatuses, and a communication line, wherein the monitoring apparatus searched out collects the predetermined information and transmits same to said monitoring host, and said monitoring host, said monitoring apparatuses and said image forming apparatus are connected to one another via said communication line, for performing communications therebetween, wherein said image forming apparatus comprises:
a status determining device that determines whether or not said image forming apparatus is registered in the image forming apparatus monitoring system;
an information display device that displays a registration status of said image forming apparatus;
a monitoring apparatus searching device operable when said image forming apparatus is determined not to be registered by said status determining device, to search the at least one monitoring apparatus that is to monitor said image forming apparatus;
a monitoring apparatus information acquiring device that acquires monitoring apparatus information from the at least one monitoring apparatus searched by said monitoring apparatus searching device;
a monitoring apparatus determining device that selects the at least one monitoring apparatus that is to monitor, based on the acquired monitoring apparatus information;
a first monitor request information transmitting device that transmits monitor request information to the at least one monitoring apparatus selected by said monitoring apparatus determining device;
a first monitor request result receiving device that receives a result of a monitor request from the at least one monitoring apparatus; and
a registration completion information storing device operable when the received result of the monitor request is a monitoring start notification, to store registration completion information in a storage area thereof;

wherein said monitoring apparatus comprises:
a monitoring apparatus information transmitting device that transmits the monitoring apparatus information to said image forming apparatus in response to the search by said monitoring apparatus searching device;
a monitor request information receiving device that receives the monitor request information from said image forming apparatus;
a second monitor request information transmitting device that transmits the received monitor request information to said monitoring host;
a second monitor request result receiving device that receives the result of the monitor request from said monitoring host;

a monitor request result transmitting device that transmits the result of the monitor request received from said monitoring host to said image forming apparatus; and a monitoring starting device operable when determining from the result of the monitor request that registration of the at least one monitoring apparatus in the monitoring host is completed, to start monitoring said image forming apparatus.

2. An image forming apparatus monitoring system as claimed in claim 1, wherein the predetermined information includes status information and counter information of said image forming apparatus.

3. An image forming apparatus monitoring system as claimed in claim 1, wherein the monitoring host comprises a holding device that holds image forming apparatus identification information for uniquely identifying a newly added image forming apparatus as new information, and holds detailed registration information for setting said image forming apparatus registered in the image forming apparatus monitoring system for monitoring by at least one of said monitoring apparatuses registered in the image forming apparatus monitoring system.

4. An image forming apparatus monitoring system as claimed in claim 1, comprising a selecting device operable when a plurality of monitoring apparatuses have been detected by said detecting device, to select a plurality of monitoring apparatuses including a monitoring apparatus with a first priority and a monitoring apparatus with a second priority, and wherein said monitoring apparatus with the second priority is operated in place of the monitoring apparatus with the first priority when a trouble occurs in the monitoring apparatus with the first priority.

5. A monitoring method for an image forming apparatus monitoring system comprising a monitoring host, a plurality of monitoring apparatuses, at least one image forming apparatus that sends predetermined information and searches at least one monitoring apparatus from the plurality of monitoring apparatuses, and a communication line, wherein the monitoring apparatus searched out collects the predetermined information and transmits same to the monitoring host, and the monitoring host, the monitoring apparatuses and the image forming apparatus are connected to one another via said communication line, for performing communications therebetween, comprising:

a holding step of holding image forming apparatus identification information for uniquely identifying a newly added image information apparatus as new information;

a status determining step of determining whether or not the image forming apparatus is registered in the image forming apparatus monitoring system;

an information displaying step of displaying a registration status of the image forming apparatus;

a monitoring apparatus searching step of searching the at least one monitoring apparatus that is to monitor the image forming apparatus when the image forming apparatus is determined not to be registered in said status determining step;

a monitoring apparatus information acquiring step of acquiring monitoring apparatus information from the at least one monitoring apparatus searched. in said monitoring apparatus searching step;

a monitoring apparatus determining step of selecting the at least one monitoring apparatus that is to monitor, based on the acquired monitoring apparatus information;

a first monitor request information transmitting step of transmitting monitor request information to the at least one monitoring apparatus selected in said monitoring apparatus determining step;

a first monitor request result receiving step of receiving a result of a monitor request from the at least one monitoring apparatus;

a registration completion information storing step of storing registration completion information in a storage area when the result of the monitor request received from the monitoring apparatus is a monitoring start notification;

a monitoring apparatus information transmitting step of transmitting the monitoring apparatus information to the image forming apparatus in response to the search in said monitoring apparatus searching step;

a monitor request information receiving step of receiving the monitor request information from the image forming apparatus;

a second monitor request information transmitting step of transmitting the received monitor request information to the monitoring host;

a second monitor request result receiving step of receiving the result of the monitor request from the monitoring host;

a monitor request result transmitting step of transmitting the result of the monitor request received from the monitoring host to the image forming apparatus; and a monitor starting step of starting monitoring the image forming apparatus when determining from the result of the monitor request that registration of the at least one monitoring apparatus in the monitoring host is completed.

6. An image forming apparatus that is capable of communicating with a monitoring apparatus that collects maintenance information from an apparatus on a network and notifies a monitoring host of the collected maintenance information, comprising:

a detecting device that detects at least one monitoring apparatus via the network; and a selecting device that selects a monitoring apparatus detected by the detecting device as a monitoring apparatus that is to monitor the image forming apparatus;

wherein when a plurality of monitoring apparatuses have been detected by said detecting device, said selecting device selects a plurality of monitoring apparatuses including a monitoring apparatus with a first priority and a monitoring apparatus with a second priority; and wherein the monitoring apparatus with the second priority is operated in place of the monitoring apparatus with the first priority when a trouble occurs in the monitoring apparatus with the first priority.

7. A control method for an image forming apparatus that is capable of communicating with a monitoring apparatus that collects maintenance information from an apparatus on a network and notifies a monitoring host of the collected maintenance information, comprising:

a detecting step of detecting at least one monitoring apparatus via the network; and a selecting step of selecting a monitoring apparatus detected in said detecting step as a monitoring apparatus that is to monitor the image forming apparatus;

wherein when a plurality of monitoring apparatuses have been detected in said detecting step, said selecting step selects a plurality of monitoring apparatuses including a monitoring apparatus with a first priority and a monitoring apparatus with a second priority; and wherein the monitoring apparatus with the second priority is operated in place of the monitoring apparatus with the first priority when a trouble occurs in the monitoring apparatus with the first priority.

8. A control method as claimed in claim 7, comprising:
a transmitting step of transmitting monitor request information to a monitoring apparatus detected in said detecting step.

9. A control method as claimed in claim 7, comprising:
a display control step of causing a display section to display a monitoring apparatus detected in said detecting step.

10. A control method as claimed in claim 9, wherein said display control step comprises causing the display section to display a monitoring apparatus detected in said detecting step based on a predetermined criterion.

11. A control method as claimed in claim 9, wherein said display control step comprises causing the display section to display attribute information of a particular monitoring apparatus detected in said detecting step; and
wherein the attribute information includes at least one of an identifier for the particular monitoring apparatus, a monitor status of the particular monitoring apparatus, communication information of the particular monitoring apparatus, and an installation place of the particular monitoring apparatus, and wherein the monitor status includes a list of image forming apparatuses to be monitored or a number of image forming apparatuses to be monitored.

12. A control method as claimed in claim 8, comprising:
a storing step of storing a selection condition, for selecting a monitoring apparatus, in a storing device;
wherein the selecting step selects at least two monitoring apparatuses from a plurality of monitoring apparatuses detected in said detecting step, based on the selection condition; and
wherein said transmitting step comprises transmitting the monitor request information to the monitoring apparatuses selected in said selecting step.

13. A control method as claimed in claim 12, wherein the selection condition includes a number of image forming apparatuses to be monitored by the monitoring apparatus, or a range of IP addresses thereof.

14. A control method as claimed in claim 8, comprising a notifying step of notifying the monitoring host of the maintenance information not via a monitoring apparatus detecting in said detecting step.

15. A computer-readable storage medium storing program code for causing a computer to execute a control method for an image forming apparatus that is capable of communicating with a monitoring apparatus that collects maintenance information from an apparatus on a network and notifies a monitoring host of the collected maintenance information, the program code comprising:
a detecting module for detecting at least one monitoring apparatus via the network; and
a selecting module for selecting a monitoring apparatus detected by said detecting module as a monitoring apparatus that is to monitor the image forming apparatus;
wherein when a plurality of monitoring apparatuses have been detected by said detecting module, said selecting module selects a plurality of monitoring apparatuses including a monitoring apparatus with a first priority and a monitoring apparatus with a second priority; and
wherein the monitoring apparatus with the second priority is operated in place of the monitoring apparatus with the first priority when a trouble occurs in the monitoring apparatus with the first priority.

* * * * *